United States Patent
Fischer et al.

[11] Patent Number: 6,119,666
[45] Date of Patent: Sep. 19, 2000

[54] DEVICE FOR CONTROLLING A MULTI-CYLINDER INTERNAL COMBUSTION ENGINE

[75] Inventors: Werner Fischer, Heimsheim; Kai-Lars Barbehoen, Munich, both of Germany

[73] Assignee: Robert Bosch GmbH, Stuttgart, Germany

[21] Appl. No.: 09/307,040

[22] Filed: May 7, 1999

[30] Foreign Application Priority Data

May 9, 1998 [DE] Germany .................. 198 20 817

[51] Int. Cl.$^7$ ................. G01M 3/00; F02P 9/00
[52] U.S. Cl. ............. 123/617; 123/612; 377/17
[58] Field of Search .............. 123/617, 612, 123/614, 630; 377/17; 73/116, 117.3

[56] References Cited

U.S. PATENT DOCUMENTS

| | | | |
|---|---|---|---|
| 4,181,884 | 1/1980 | Shirasaki et al. | 324/207.25 |
| 4,553,426 | 11/1985 | Capurka | 73/116 |
| 4,582,033 | 4/1986 | Sorg et al. | 123/406 |
| 5,317,614 | 5/1994 | Davis et al. | 377/17 |
| 5,434,800 | 7/1995 | Davis et al. | 702/151 |
| 5,447,143 | 9/1995 | Ott et al. | 123/612 |
| 5,460,134 | 10/1995 | Ott et al. | 123/476 |
| 5,829,412 | 11/1998 | Klatt et al. | 123/500 |
| 5,978,436 | 11/1999 | Lohse et al. | 377/17 |

FOREIGN PATENT DOCUMENTS 29 47 412 A1  6/1981  Germany .

Primary Examiner—Henry C. Yuen
Assistant Examiner—Hieu T. Vo
Attorney, Agent, or Firm—Michael J. Striker

[57] ABSTRACT

A device for controlling a multi-cylinder internal combustion engine with a rotatable shaft has a transmitter wheel mountable on the rotatable shaft and having a number of uniform spaced angular marks spaced and at least one reference mark which as a synchronization mark for forming control pulses for the internal combustion engine, a sensor which senses the transmission wheel and supplies a rectangular output signal corresponding to its surface, a computing device which evaluates the output signal and compares time intervals of uniform signal flanks with one another or sets them relative to one another in a certain ratio, to recognize the reference mark, and after a first recognition of the reference mark occurrence of the reference mark by counting of the uniform signal flanks is recognized and in addition the distance of the signal flanks is tested and thereby the recognized reference mark is tested for plausibility, an error counter arranged so that when a non plausibility is recognized it is incremented by 1 and during computation of the control pulses the reference mark is considered and a next detection of the reference mark is performed with a same process until a counter condition of the error counter reaches a predetermined value, and when the counter condition reaches the predetermined value a synchronization is rejected and a new synchronization is performed.

6 Claims, 1 Drawing Sheet

DEVICE FOR CONTROLLING A MULTI-CYLINDER INTERNAL COMBUSTION ENGINE

BACKGROUND OF THE INVENTION

The present invention relates to a device for controlling a multi-cylinder internal combustion engine, in particular a diesel motor.

In a multi-cylinder internal combustion engine with a crank and a camshaft a control device computes when and how much fuel per cylinder must be injected. It must be guaranteed that the fuel is supplied to the individual cylinders at a proper time point and in a proper quantity. For performing computations in a correct way, the corresponding adjustment of the crank or camshaft of the internal combustion must be known. It is conventional to use corresponding sensors which scan the transmitter wheels provided with characteristic surfaces and connected with the shafts. By evaluations of the signals, the angular positions of the shafts can be determined.

In diesel internal combustion engines, for example in such which are based on distributor injection pumps, the measuring function is based on an accurate angle information, which is made available by an incremental angle sensor-system (IWZ system) for the metering control device. It is very important that the metering algorisms of the software can be synchronized to predetermined reference marks of the incremental tooth signals. For example the software uses as a reference a gap which is definitely provided on a transmitter wheel with uniform angle marks (teeth), which gap is formed by one or two missing angle marks. When inside an injection cycle, such a gap is not recognized or recognized too late, a synchronization error occurs.

In the currently utilized systems, actual synchronization errors are subjected to a so-called error repulsing routine. In other words, an error must occur continuously over a predetermined time period in order to be qualified as a defect classification. With the defect classification then the fuel metering is adjusted, since a correct function can no longer be guaranteed. Then a new synchronization of the software with the tooth signal, or in other words by evaluation of the intervals of signal flanks is performed. With such a process interruptions of the fuel metering are caused, which lead to interruptions in the ignition process, which in turn lead to affecting of the traveling comfort.

German document DE-OS 29 47 412 discloses a device for reference mark recognition in an internal combustion engine, in which the reference mark is formed as a gap between regular angle marks. The transmitter wheel is connected to the shaft of the internal combustion engine and sensed by a sensor. From the evaluation of the input signals of the sensor, the control device of the internal combustion engine can recognize the reference marks (gaps). In particular, first an evaluation is performed in which time intervals between predeterminable signal flanks are evaluated. When such a time distance is greater than a previously detected time distance, the reference mark is recognized. Subsequently, the next reference mark is recognized. In particular, a counter counts signal flanks upwards until a value which corresponds to the number of the angle marks between two reference marks. For controlling, at least it is checked timely whether the reference marks obtained by upward counting of the signal flanks correspond to the actual reference mark. For this purpose it is evaluated whether simultaneously to the recognized reference mark, the time distance between successive angle marks is greater than the predetermined time distances. If the both comparisons result in non-plausibility, the control device switches to a new synchronization, and the reference mark search is performed again exclusively after the time interval evaluation.

SUMMARY OF THE INVENTION

Accordingly, it is an object of the present invention to provide a device for controlling a multi-cylinder internal combustion engine, which avoids the disadvantages of the prior art.

In keeping with these objects and with others which will become apparent hereinafter, one feature of present invention resides, briefly stated in a device which has a transmitter wheel mountable on the rotatable shaft, said transmitter wheel having a predetermined number of uniform angular marks spaced from one another by regular distances and at least one reference mark which is characterized by a greater distances and serves as a synchronization mark for forming control pulses for the internal combustion engine; a sensor which senses said transmission wheel and supplies a rectangular output signal corresponding to its surface; a computing device which evaluates the output signal and compares time intervals of uniform signal flanks with one another or sets them relative to one another in a certain ratio, so that the reference marks is recognized from a significant deviation of a distance or a ratio, and after a first recognition of the reference mark occurrence of the reference mark by counting of the uniform signal flanks is recognized and in addition the distance of the signal flanks is tested and thereby the recognized reference mark is tested for plausibility; an error counter arranged so that when a non plausibility is recognized it is incremented by 1 and during computation of said control pulses for the internal combustion engine the reference mark is considered and a next detection of the reference mark is performed with a same process until a counter condition of said error counter reaches a predetermined value, and when the counter condition reaches the predetermined value a synchronization is rejected and a new synchronization is performed.

When the device for controlling a multi-cylinder internal combustion engine is designed in accordance with the present invention, it has the advantage that after an occurring synchronization error, or a non-plausibility during the recognition of the reference mark, a new synchronization is possible without interrupting the metering of fuel and forming of control signals for the internal combustion engine. As a result, in an advantageous manner no combustion interruption occurs.

In the inventive device when the non-plausibility is recognized, the control signals are set, and the non-plausibility however is considered in the way that the content of a counter is increased by 1. The next occurrence of the reference mark is subsequently determined and also tested for plausibility. When again a non-plausibility is detected, the error counter again is increased by 1 and the process is repeated until the counter condition reaches a predetermined limiting value. At the end, the synchronization is rejected and a new synchronization in accordance with a first method, in particular by evaluation of the time intervals between the signal flanks, is performed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
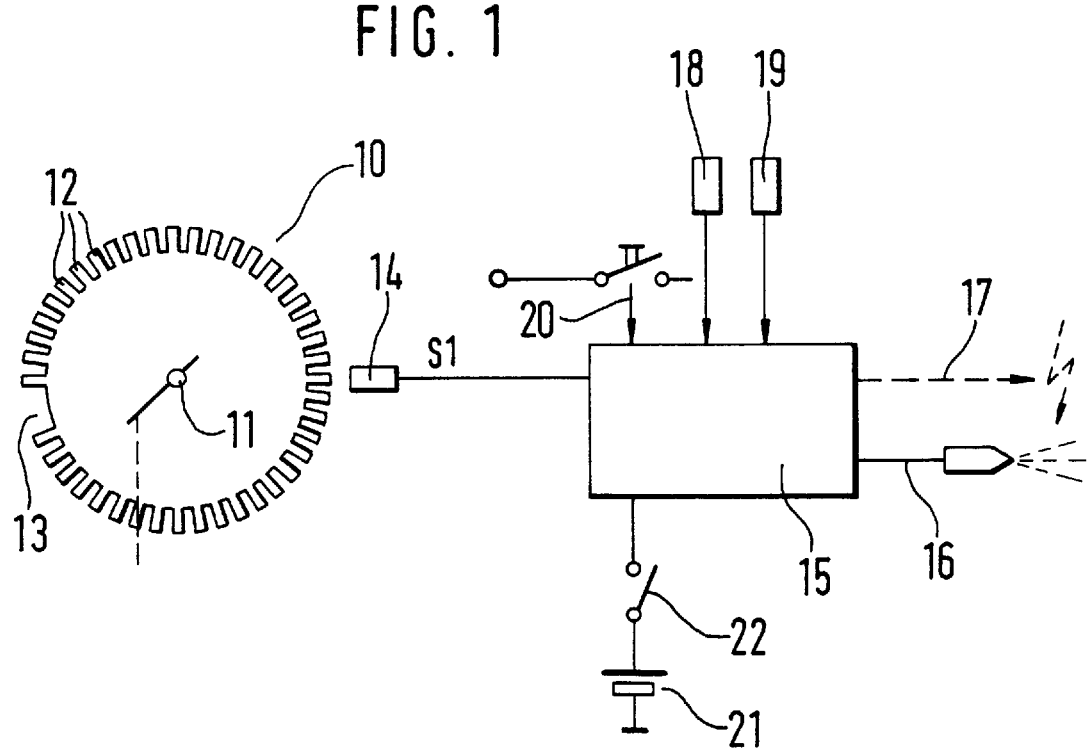
FIG. 1 is a view showing components of an internal combustion engine which are necessary for understanding the present invention with an inventive device for controlling the internal combustion engine.

Components of an internal combustion engine which are controlled by an inventive device are illustrated schematically in FIG. 1. The device has a transmitter wheel identified with reference numeral 10 and is fixedly connected with a shaft 11 of the internal combustion engine. On its periphery it is provided with a plurality of uniform angle marks 12 which are spaced from one another by the same distances. In addition to these uniform angle marks 12, reference marks 13 are provided. They are formed for example by two missing angle marks. The number of the uniform angle marks which are also identified as teeth amounts to approximately 58 (60-2). Instead of one reference mark 13 also several reference marks can be provided. For example a cylinder-dependent number of the reference marks is possible. In some cases reference marks which are different from one another can be provided as well.

The shaft 11 can be for example a pump drive shaft of a distributor injection pump which is driven by a cam shaft. The shaft 11 can be however the cam shaft or the crankshaft of an internal combustion engine. The transmitter disk 10 is scanned by a stationary sensor 14, for example an inductive sensor or a Hall sensor. When the angle marks pass by, voltages are produced in the sensor 14 and supplied as output signals S1 to a control device 15. This voltages are converted in the sensor or in the control device into rectangular signals. There raising flanks correspond for example to the beginning of an angle mark, while their falling flanks correspond for example to the end of an angle mark. These signals or the time sequence of the individual signal flanks are further processed in the control device 15 for forming control signals for the internal combustion engine, for example for the injection and/or the ignition. These signals are outputted through outputs 16 and 17 of the control device 15.

In addition to the signal S1, the control device 15 receives further input values which are required for controlling or adjustment. These required input values are measured by corresponding signals 18 and 19. The sensors 18 and 19 can be for example temperature sensors or further angle sensors which detect the angular position of another shaft of the internal combustion engine. The control device receives the start signal through an output 20 for turning on of the internal combustion engine. The voltage supply is performed from a battery 21 by closing of a switch 22. The control device 15 includes not shown processor means, such as a memory in which the values required for the computations can be intermediately stored. Furthermore, the control device 15 includes several not shown counters or counting means.

Figure 2:
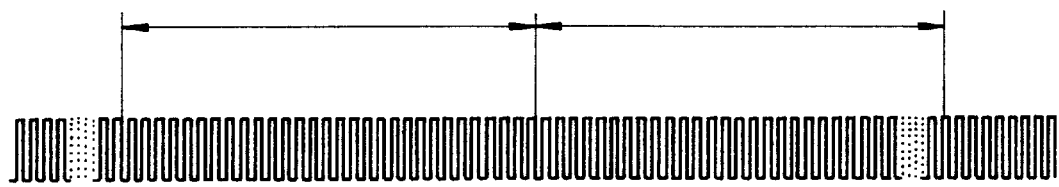
FIG. 2 is a view showing a signal course to be evaluated.

The rectangular signal evaluated by the control device is shown in FIG. 2. The gap caused by the reference marks between the number of regular pulses can be recognized here. The recognition of the gap makes possible ultimately the synchronization. Since the relationship between the position of the reference mark 13 or the gap 11 and the position of the individual cylinder is known to the control device 15, therefore after the recognition of the reference mark and the subsequent synchronization, the proper adjustments for controlling of the internal combustion engine are released. How the synchronization and the interruption-free metering is performed during a correspondingly required new synchronization in detail, is explained herein below.

After the start of the internal combustion engine, the first reference mark or recognition or synchronization is performed by monitoring the angle mark intervals (tooth intervals) of the transmission wheel 10. When in the control device a tooth interval is detected, whose length for example is greater than the double the predetermined tooth distance, the control device recognize the reference mark and the condition "gap 1 recognized" is set. Instead of a selectable time interval, also a time ratio for recognition of the reference marks can be evaluated. After the first recognition of the reference mark, in the control device subsequent selectable tooth flanks are counted. Since the number of the angle marks 12 or teeth is known to the control device, therefore by counting the signal flanks the next following reference mark is recognized. If the next recognized gap after the maximal allowable number of flanks, a complete, correct signal is recognized and the status "synchronized" is set. The metering or the outputting of control signals can then start. Under segment, the distance between two reference marks is identified. The number of the reference marks can be selected in dependence on the cylinder number.

After the first synchronization, for determination of the next reference mark the number of the signal flanks is counted. When the counter has counted the predeterminable number, the reference mark is recognized or a corresponding signal is outputted. When the count value corresponds to a value which allows recognition of the angle mark from the reference mark, additionally the distance of the signal flanks is tested for plausibilization. When this testing is performed at a time at which the reference mark (gap) must occur, no longer time between two signal flanks, a plausibility error (synchronization error) is recognized and a first error counter in the control device 15 is incremented by 1.

In the next segment this process is repeated. If the plausibility error no longer occurs, it is a temporary error without influence on the metering or on the release of control signals for controlling the internal combustion engine. If however the error occurs in the following signal and in the subsequent segments again, the error counter is increased correspondingly by 1. When the counter content exceeds an applicable or selectable threshold value A, the status "synchronized" is removed. It is important that the metering or the formation of control signals is not interrupted. For metering of fuel or for formation of corresponding injection signals, the recognized but not plausible reference mark is utilized.

By removing the status "synchronized" the control device searches to obtain a new synchronization. For this purpose in the signal flank selection, not only the number of the occurring signal flanks is counted, but also the duration of the signal flanks which follow one another is checked, as during the first synchronization. With this process, the "lost" reference mark, is searched parallel to the metering processing or to the production of control signals.

When during the new reference mark search the reference mark is recognized by the occurring of the greater signal interval, the thusly recognized reference mark is utilized for synchronization and the fuel metering starts from this reference again. Also, during the required new synchronization the fuel metering is not interrupted. For the operation of the internal combustion engine it is important that a synchronization error does not lead to any sensible disturbances since the recognition of a disturbance pulse as an angular mark or the non recognition of an angular mark leads however to a displacement of the metering by substantially 3°. Since however during a longer time or more frequently occurring disturbances, quantity errors can occur which can lead to generation of smoke and/or can cause injection operation error leading to smoke and noise, therefore in addition to the above described process, the error counting during the search of the new synchronization is further incremented. When the counter condition of the error counter exceeds a further higher threshold B, the new synchronization time or the number of the searched new synchronization exceeds a maximum value. The system is then classified as having a defect, and a metering is adjusted for forming control signals after the existing concept. Then for example, with the use of the output signals of other sensors, an emergency running is activated, so that at least the next shop can be reached. In addition, a second error counter during each new synchronization search is incremented, or in other words the counter condition is increased by 1. Whereby an information can be recovered, from which it is recognized how often the system after a reset or in other words after "loosing" one reference mark has taken the new synchronization process in consideration. If this counter exceeds a further threshold value C, the system is also classified as having a defect and a metering is performed in corresponding with the previous concept, since a non intact system indicates a frequent new synchronization. In this case also an emergency running with the use of other sensors can be activated.

The above described device is especially suitable for measuring operations of modern distributor injection pumps and is based on an accurate angle information which is made available by a so-called incremental angle sensor system of the measuring control device. The transmitter wheel is mounted on the pump drive shaft. The measuring algorism of the software incremented in the control device (pump control device) is synchronized to determine reference marks of the incremental tooth signal. For example the software takes the gaps definitely provided on the transmitter disks as reference marks.

It will be understood that each of the elements described above, or two or more together, may also find a useful application in other types of constructions differing from the types described above.

While the invention has been illustrated and described as embodied in device for controlling a multi-cylinder internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling a multi-cylinder internal combustion engine with a rotatable shaft; comprising a transmitter wheel mountable on the rotatable shaft, said transmitter wheel having a predetermined number of uniform angular marks spaced from one another by regular distance and at least one reference mark which is characterized by a greater distances and serves as a synchronization mark for forming control pulses for the internal combustion engine; a sensor which senses said transmission wheel and supplies a rectangular output signal corresponding to its surface; a computing device which evaluates the output signal and compares time intervals of uniform signal flanks with one another or sets them relative to one another in a certain ratio, so that the reference marks is recognized from a significant deviation of a distance or a ratio, and after a first recognition of the reference mark, occurrence of the reference mark by counting of the uniform signal flanks is recognized and in addition the distance of the signal flanks is tested and thereby the recognized reference mark is tested for plausibility; and an error counter arranged so that when a non plausibility is recognized it is incremented by 1 and during computation of said control pulses for the internal combustion engine the reference mark is considered and a next detection of the reference mark is performed with a same process until a counter condition of said error counter reaches a predetermined value, and when the counter condition reaches the predetermined value a synchronization is rejected and a new synchronization is performed.

2. A device as defined in claim 1, wherein the device is used for the internal combustion engine which is a diesel internal combustion engine with a distributor injection pump, said transmitter wheel being mountable on a pump drive shaft, said computing device being formed as a pump control device.

3. A device as defined in claim 1, wherein the device is used for an internal combustion engine in which the shaft is a shaft selected from the group consisting of a crankshaft and a camshaft, said computing device being formed as a control device of the internal combustion engine, so that the control signals of the control device are used for ignition or injection of the internal combustion engine.

4. A device as defined in claim 1, wherein said error counter is formed so that during a search of the new synchronization it is further incremented until a counter condition of said error counter reaches a second threshold value, a system defect is recognized, and a control device interrupts a conventional adjustment of the internal combustion engine and switches it to an emergency operation.

5. A device as defined in claim 1; and further comprising a second error counter which with each provided new synchronization is incremented by 1 until said second error counter reaches a third threshold value, a system defect is recognized, and a control device is switched to an emergency operation.

6. A method for controlling a multi-cylinder internal combustion engine with a rotatable shaft, comprising the steps of providing a transmitter wheel mountable on the rotatable shaft, said transmitter wheel having a predetermined number of uniform angular marks spaced from one another by regular distances and at least one reference mark which is characterized by a greater distances and serves as a synchronization mark for forming control pulses for the internal combustion engine; sensing with a sensor said transmission wheel and supplying a rectangular output signal corresponding to its surface; evaluating with a computing device the output signal and comparing time intervals of uniform signal flanks with one another or setting them relative to one another in a certain ratio, so that the reference marks is recognized from a significant deviation of a distance or a ratio, and after a first recognition of the reference mark recognizing occurrence of the reference mark by counting of the uniform signal flanks and in addition testing the distance of the signal flanks and thereby testing the recognized reference mark for plausibility; using an error counter so that when a non plausibility is recognized it is incremented by 1 and during computation of said control pulses for the internal combustion engine the reference mark is considered and a next detection of the reference mark is performed with a same process until a counter condition of said error counter reaches a predetermined value, and when the counter condition reaches the predetermined value rejecting a synchronization and performing a new synchronization.

* * * * *